(12) United States Patent
Tamura

(10) Patent No.: US 10,901,537 B2
(45) Date of Patent: Jan. 26, 2021

(54) WRITING INPUT APPARATUS

(71) Applicant: SHARP KABUSHIKI KAISHA, Sakai (JP)

(72) Inventor: Naoki Tamura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/700,516

(22) Filed: Dec. 2, 2019

(65) Prior Publication Data
US 2020/0183506 A1 Jun. 11, 2020

(30) Foreign Application Priority Data
Dec. 5, 2018 (JP) ................. 2018-227934

(51) Int. Cl.
*G06F 3/041* (2006.01)
*G06F 3/0354* (2013.01)
*G06F 3/0346* (2013.01)

(52) U.S. Cl.
CPC ........ *G06F 3/03545* (2013.01); *G06F 3/0346* (2013.01); *G06F 3/04146* (2019.05)

(58) Field of Classification Search
None
See application file for complete search history.

(56) References Cited

U.S. PATENT DOCUMENTS

| 2010/0007613 A1* | 1/2010 | Costa | G06F 3/0488 345/173 |
| 2017/0249048 A1* | 8/2017 | Hill | G06F 1/1694 |
| 2017/0357339 A1* | 12/2017 | Bathiche | G06F 3/038 |

FOREIGN PATENT DOCUMENTS

JP 2015-176467 A 10/2015

* cited by examiner

*Primary Examiner* — Joseph R Haley
(74) *Attorney, Agent, or Firm* — ScienBiziP, P.C.

(57) ABSTRACT

The writing input apparatus includes a touch panel input device, an input detector that detects touch input to the touch panel input device, a touch-pressure detector that detects a touch pressure applied to the touch panel input device and corresponding to the touch input detected by the input detector, a tilt angle detector that detects a tilt angle with a horizontally placed state of the touch panel input device being a reference, and an input characteristic determination device that determines an input characteristic corresponding to the touch input on the basis of the touch pressure detected by the touch-pressure detector and the tilt angle detected by the tilt angle detector.

9 Claims, 9 Drawing Sheets

| TOUCH PRESSURE | EVALUATION AMOUNT |
|---|---|
| P1 | Pa1(Pa1>Pb1) |
| P2 | Pa2(Pa2>Pb2) |
| P3 | Pa3(Pa3>Pb3) |
| P4 | Pa4(Pa4>Pb4) |
| P5 | Pa5(Pa5>Pb5) |
| ... | ... |

| TOUCH PRESSURE | EVALUATION AMOUNT |
|---|---|
| P1 | Pb1(Pa1>Pb1) |
| P2 | Pb2(Pa2>Pb2) |
| P3 | Pb3(Pa3>Pb3) |
| P4 | Pb4(Pa4>Pb4) |
| P5 | Pb5(Pa5>Pb5) |
| ... | ... |

| TOUCH PRESSURE | LINE WIDTH |
|---|---|
| P1 | Wa1(Wa1>Wb1) |
| P2 | Wa2(Wa2>Wb2) |
| P3 | Wa3(Wa3>Wb3) |
| P4 | Wa4(Wa4>Wb4) |
| P5 | Wa5(Wa5>Wb5) |
| ... | ... |

| TOUCH PRESSURE | LINE WIDTH |
|---|---|
| P1 | Wb1(Wa1>Wb1) |
| P2 | Wb2(Wa2>Wb2) |
| P3 | Wb3(Wa3>Wb3) |
| P4 | Wb4(Wa4>Wb4) |
| P5 | Wb5(Wa5>Wb5) |
| ... | ... |

WRITING INPUT APPARATUS

INCORPORATION BY REFERENCE

This application is based upon and claims the benefit of priority from the corresponding Japanese Patent Application No. 2018-227934 filed on Dec. 5, 2018, the entire contents of which are incorporated herein by reference.

BACKGROUND OF THE INVENTION

Field of the Invention

The present disclosure relates to a writing input apparatus that includes a touch panel.

Description of the Background Art

A writing input apparatus that accepts an instruction input (a touch input) from a user using a touch panel (also referred to as a touch panel input device) is widely used. In the writing input apparatus, for example, the user's finger, a touch pen, or the like touches the touch panel while an image input from an external device or the like appears on a display. In such a case, the user can write handwritten characters and figures such as symbols on a touched position. For example, as such a writing input apparatus, an apparatus that can be placed (placed in parallel) and used such that a display surface is parallel to a floor surface (placement surface) in a meeting and the like has conventionally been proposed.

Here, in the case where writing is input in two ways of usage that are horizontal placement of the touch panel and vertical placement of the touch panel, application of a force (a writing pressure) unintentionally differs due to a difference in a writing posture of the user. For example, in the case where the touch panel is used in a horizontal placement, the user writes with a pen tip pointing down in a state where the user places the pen tip on a surface of the touch panel (an input surface). Thus, the user unintentionally inputs writing with the strong writing pressure. Meanwhile, in the case where the touch panel is used in the vertical placement, the user writes with the pen tip pointing sideways in a state where the pen is supported by his/her arm. Thus, the user writes in an unstable state and unintentionally inputs writing with the weak writing pressure.

Just as described, the user intends to input writing with a similar amount of the writing pressure in the horizontal placement and the vertical placement. However, in regard to the writing input to the touch panel, in the case where writing is input using a writing pressure value and the same input control is executed in the horizontal placement and the vertical placement, the detected writing pressure values differ.

SUMMARY OF THE INVENTION

A purpose of the present disclosure is to provide a writing input apparatus capable of preventing an unintentional writing pressure difference caused by a difference in a writing posture of a user at the time when a touch panel is used in horizontal placement and vertical placement.

A writing input device according to an aspect of the present disclosure includes a touch panel input device, an input detector that detects touch input to the touch panel input device, a touch-pressure detector that detects a touch pressure as a pressing force applied to the touch panel input device and corresponding to the touch input detected by the input detector, a tilt angle detector that detects a tilt angle with a horizontally placed state of the touch panel input device being a reference, and an input characteristic determination device that determines an input characteristic corresponding to the touch input on the basis of the touch pressure detected by the touch-pressure detector and the tilt angle detected by the tilt angle detector.

According to the present disclosure, it is possible to prevent an unintentional writing pressure difference caused by a difference in a writing posture of a user at the time when a touch panel is used in horizontal placement and vertical placement.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A is table illustrating a configuration of a first evaluation amount table that is stored in the writing input apparatus according to the embodiment of the present disclosure.

FIG. 4B is table illustrating a configuration of a second evaluation amount table that is stored in the writing input apparatus according to the embodiment of the present disclosure.

FIG. 8A is table illustrating a configuration of a first line width table that is stored in the writing input apparatus according to the embodiment of the present disclosure.

FIG. 8B is table illustrating a configuration of a second line width table that is stored in the writing input apparatus according to the embodiment of the present disclosure.

DESCRIPTION OF THE PREFERRED EMBODIMENTS

A description will hereinafter be made on an embodiment of the present disclosure with reference to the accompanying drawings. The following embodiment is an example that embodies the present disclosure and has a character of not limiting the technical scope of the present disclosure.

First Embodiment

Figure 1:
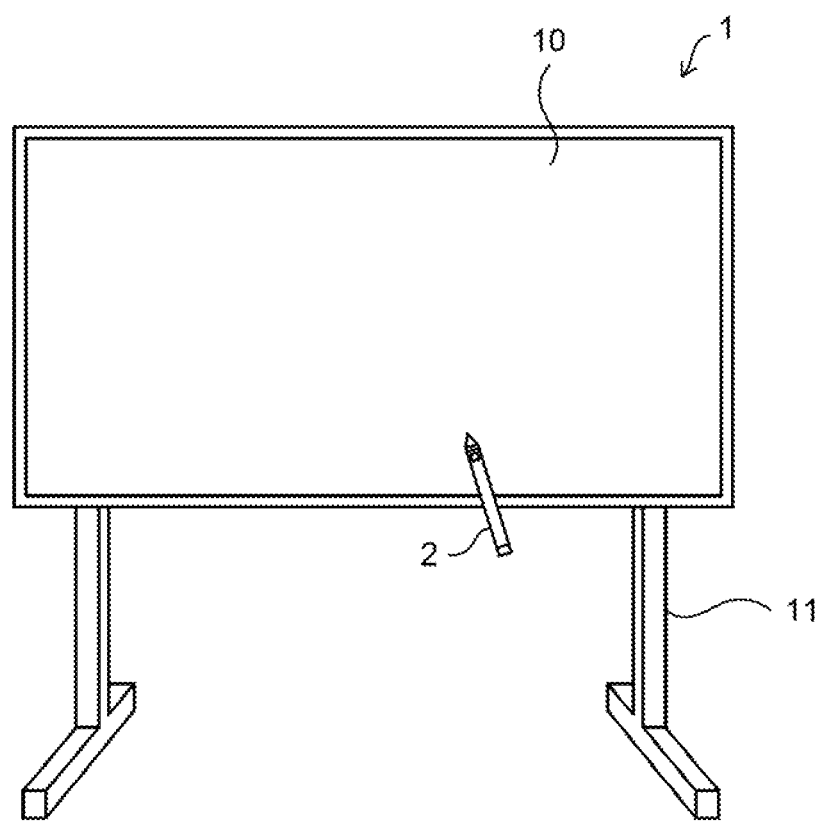
FIG. 1 is an external view illustrating a configuration of a writing input apparatus according to an embodiment of the present disclosure.
Figure 2A:
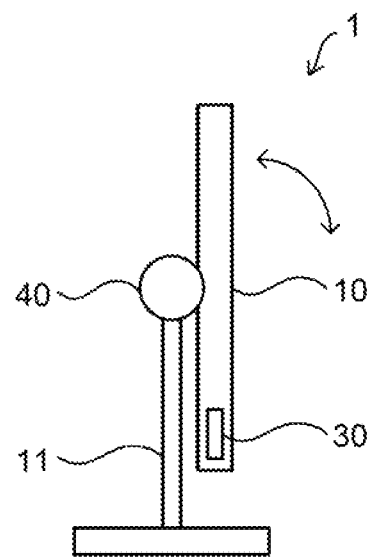
FIG. 2A is a side view illustrating a configuration of the writing input apparatus in a vertical posture according to the embodiment of the present disclosure.
Figure 2B:
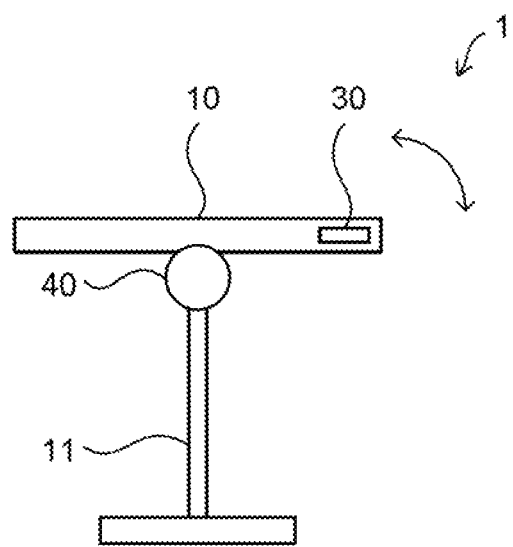
FIG. 2B is a side view illustrating a configuration of the writing input apparatus in a horizontal posture according to the embodiment of the present disclosure.

As illustrated in FIG. 1, a writing input apparatus 1 according to a first embodiment of the present disclosure includes a touch panel display 10 on which handwritten characters and the like can be written with a touch pen 2 or a user's finger. For example, the touch panel display 10 is rotatably supported by legs 11. More specifically, as illustrated in FIG. 2A and FIG. 2B, the touch panel display 10 is rotatably supported by an angle adjuster 40 that is fixed to each of the legs 11. For example, the touch panel display 10 is supported in a manner to be rotatable between a vertical placement posture illustrated in FIG. 2A and a horizontal placement posture illustrated in FIG. 2B. The user can use the touch panel display 10 in a state of having the vertical placement posture (a vertical posture), in a state of having the horizontal placement posture (a horizontal posture), or in a state of having any posture (an oblique posture) between the vertical posture and the horizontal posture. That is, the touch panel display 10 is configured to be rotatable within a range from 0 degree to an angle (90 degrees) in the vertically placed state (see FIG. 2A) with the horizontally placed state (see FIG. 2B) being a reference (0 degree). The touch panel display 10 may be configured to be switchable to a specified angle (a specified step) or may be configured to be able to adjust the angle in a stepless manner.

Figure 3:
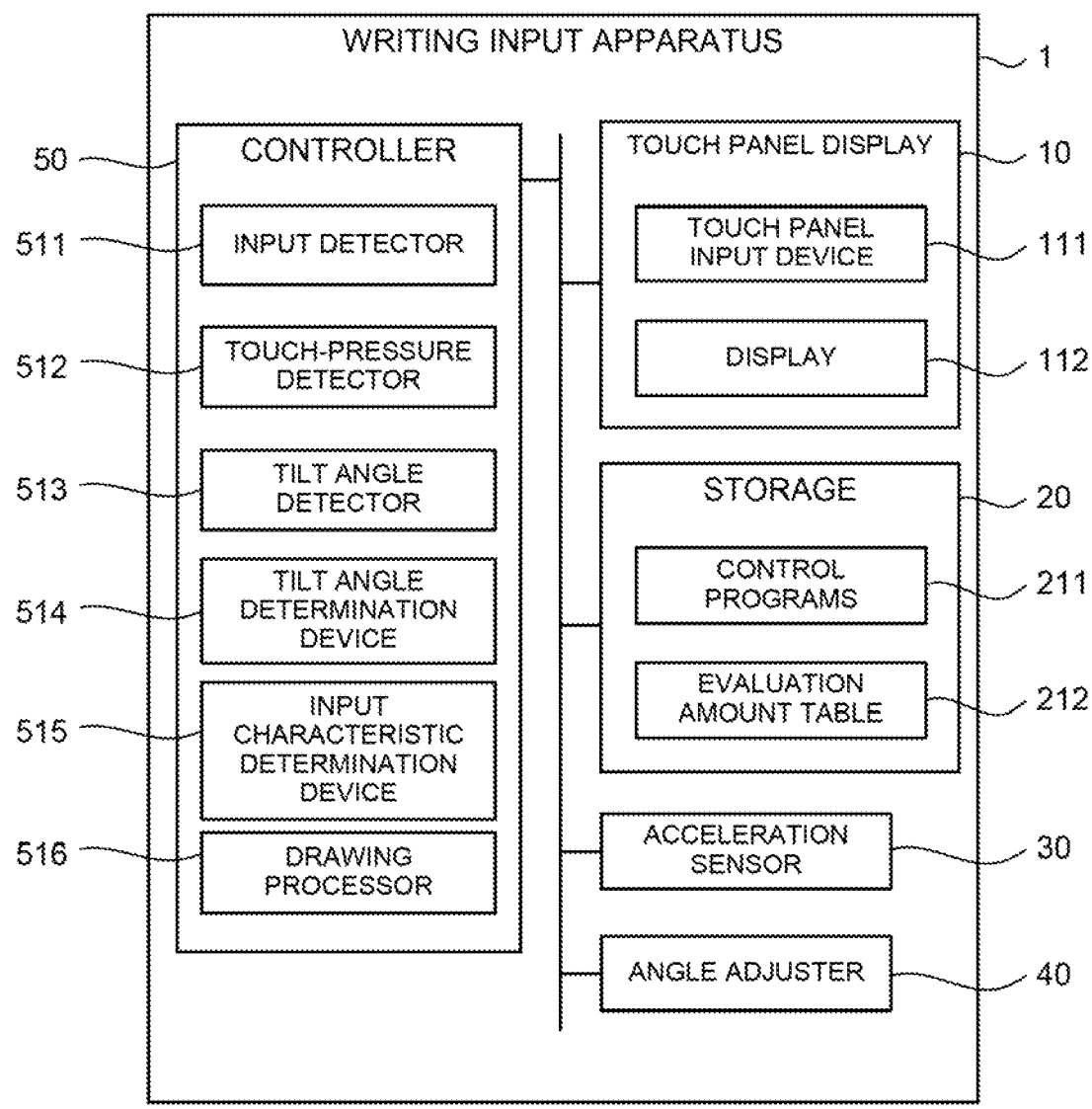
FIG. 3 is a block diagram illustrating the configuration of the writing input apparatus according to the embodiment of the present disclosure.

FIG. 3 is a block diagram illustrating the configuration of the writing input apparatus 1. The writing input apparatus 1 includes the touch panel display 10, a storage 20, an acceleration sensor 30, the angle adjuster 40, and a controller 50.

The touch panel display 10 includes a touch panel input device 111 and a display 112.

The display 112 is a display that shows an image, and is a liquid crystal display, for example.

The touch panel input device 111 accepts a touch input by the user's touch pen 2 or the user's finger to the touch panel input device 111. The touch panel input device 111 may be a touch panel of a capacitance type or a touch panel of a pressure-sensitive type. That is, the touch panel input device 111 may be any device that can accept the touch input by the user, such as a touch. The touch panel input device 111 may be arranged on a front surface of the display 112 or may be installed in the display 112. The touch panel input device 111 and the display 112 may be arranged at mutually separated positions, and may be configured to be communicable with each other. A description will hereinafter be made on the integrated touch panel display 10 in which the touch panel input device 111 is arranged on the front surface of the display 112 and in which the touch panel input device 111 and the display 112 are formed integrally.

The touch pen 2 (see FIG. 1) is an electronic pen that allows the user to make the touch input to the touch panel input device 111. For example, the user makes the touch input to an input surface (a display surface) of the touch panel input device 111 using the touch pen 2 or his/her finger.

The acceleration sensor 30 detects a tilt with respect to a gravity direction. More specifically, as illustrated in FIG. 2A and FIG. 2B, the acceleration sensor 30 is provided to an outer frame of the touch panel display 10, or the like, and detects a tilt angle of the touch panel display 10. In the case where the touch panel input device 111 and the display 112 are arranged separately, the acceleration sensor 30 is provided in the touch panel input device 111.

The angle adjuster 40 is a support member that adjusts the tilt angle of the touch panel display 10 so as to support the touch panel display 10 at the specified angle. The angle adjuster 40 may be configured to be able to switch the tilt angle in two steps that are the tilt angle (0 degree) in the horizontal posture (see FIG. 2B) and the tilt angle (90 degrees) in the vertical posture (see FIG. 2A), or may be configured to be able to switch the tilt angle in three steps or more including a pre-set tilt angle that is greater than 0 degree and less than 90 degrees. Alternatively, the angle adjuster 40 may be configured to be switchable in the stepless (continuous) manner from 0 degree to 90 degrees.

The angle adjuster 40 adjusts the tilt angle of the touch panel display 10 according to the user's operation. For example, in the case where the touch panel display 10 is in the vertical posture (see FIG. 2A), the user holds the outer frame or the like of the touch panel display 10 and rotates the touch panel display 10 90 degrees horizontally with the angle adjuster 40 as a fulcrum. In such a case, the angle adjuster 40 rotates the touch panel display 10 90 degrees and supports the touch panel display 10 in the horizontal posture (see FIG. 2B). In addition, in the case where the touch panel display 10 is in the horizontal posture (see FIG. 2B), the user holds the outer frame or the like of the touch panel display 10 and rotates the touch panel display 10 90 degrees vertically with the angle adjuster 40 as the fulcrum. In such a case, the angle adjuster 40 rotates the touch panel display 10 90 degrees and supports the touch panel display 10 in the vertical posture (see FIG. 2A).

The angle adjuster 40 may automatically adjust the tilt angle of the touch panel display 10 on the basis of an instruction from the controller 50. For example, in the case where the touch panel display 10 is in the vertical posture (see FIG. 2A) and the user presses a posture switch button (not illustrated), the controller 50 sends a rotation instruction (a drive signal) to the angle adjuster 40, and the angle adjuster 40 rotates the touch panel display 10 90 degrees horizontally and supports the touch panel display 10 in the horizontal posture (see FIG. 2B) on the basis of the rotation instruction.

The storage 20 is a non-volatile storage, such as a hard disk drive (HDD) or a solid-state drive (SSD), that stores various types of information. More specifically, the storage 20 stores the information such as an evaluation amount table 212.

More specifically, the storage 20 stores a plurality of the evaluation amount tables 212 corresponding to the tilt angle of the touch panel display 10. In each of the evaluation amount tables 212, a touch pressure (a writing pressure), which is a pressing force corresponding to the touch input to the touch panel input device 111 and is detected by the controller 50 (a touch-pressure detector 512), and an evaluation amount as an input characteristic corresponding to the touch pressure are associated with each other. The evaluation amount is a writing pressure value that evaluates the writing pressure (touch input intensity) intended by the user, in other words, a corrected writing pressure value to which the touch input intensity is reflected.

The evaluation amounts corresponding to the touch pressures are set to mutually different values in the plurality of the evaluation amount tables 212. FIG. 4A is table illustrating an example of a first evaluation amount table 212A that corresponds to the tilt angle at 90 degrees (the vertical posture), and FIG. 4B is table illustrating an example of a second evaluation amount table 212B that corresponds to the tilt angle at 0 degree (the horizontal posture). The first evaluation amount table 212A is an example of the first characteristic and the first table of the present disclosure, and the second evaluation amount table 212B is an example of the second characteristic and the second table of the present disclosure. In FIG. 4A and FIG. 4B, each of P1 to P5 is not limited to the touch pressure that exactly indicates a single numerical value. Each of P1 to P5 may be the touch pressure that indicates a numerical range sectioned within a certain range, or may be a representative value that corresponds to the numerical range sectioned within the certain range.

The same touch pressures are set in the first evaluation amount table 212A and the second evaluation amount table 212B. The evaluation amount set for each of the touch pressures in the second evaluation amount table 212B is smaller than the evaluation amount set in the first evaluation amount table 212A. For example, at a touch pressure P5, an evaluation amount Pb5 set in the second evaluation amount table 212B is smaller than an evaluation amount Pa5 set in the first evaluation amount table 212A (Pa5>Pb5).

Note that the "table" referred in the present specification means all "information that describes a correlation for acquisition of an output value with respect to an input value". Each of FIG. 4A and FIG. 4B exemplifies, as the example of the "table", the information that describes correlations for the acquisition of the pressing force (the touch pressure) as the input value and the evaluation amount as the output value in the table format. However, the present disclosure is not limited thereto. For example, the correlation between the input value and the output value may be defined in a function format. In addition, the "table" may be described using the correlation for the acquisition of the output values with respect to the continuous input values, or may describe the correlations for the acquisition of the output values with respect to discretized input values.

Figure 5:
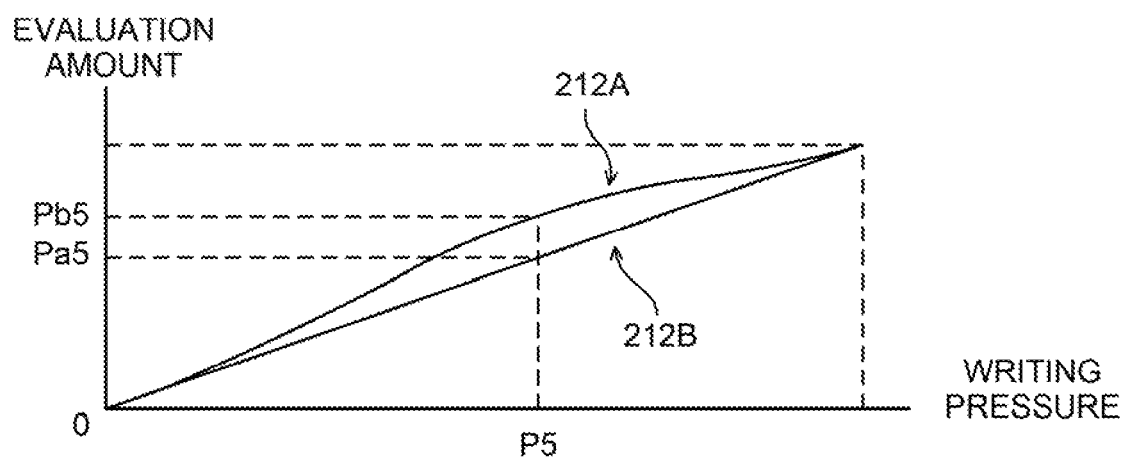
FIG. 5 is a graph illustrating a change in the evaluation amount with respect to a touch pressure corresponding to the first evaluation amount table and the second evaluation amount table in the writing input apparatus according to the embodiment of the present disclosure.

FIG. 5 is a graph illustrating a change in the evaluation amount with respect to the touch pressure corresponding to the first evaluation amount table 212A and the second evaluation amount table 212B.

The storage 20 also stores setting information used at the time of drawing the information (characters, a figure, and the like) corresponding to the touch input on the display 112. The setting information is a line width representing a width (thickness) of a line, a shade of the line, and the like, for example. For example, the storage 20 stores a line width information table, in which the writing pressure and the line width are associated with each other, and a shade information table, in which the writing pressure and the shade are associated with each other. For example, in the line width information table, the line width that is associated with the writing pressure corresponding to the evaluation amount is referred to determine the line width corresponding to the evaluation amount. The writing pressure and the line width are associated with each other in a one-to-one relationship.

The storage 20 further stores control programs 211 such as a writing input program that makes the controller 50 execute writing input processing (see FIG. 6) described later.

For example, the writing input program is recorded in a computer-readable recording medium such as a CD or a DVD in a non-temporary manner, is read by a reader (not illustrated) such as a CD drive or a DVD drive provided in the writing input apparatus 1, and is stored in the storage 20. Alternatively, the writing input program may be downloaded from a server accessible from the writing input apparatus 1 and stored in the storage 20.

The controller 50 has control devices such as a central processing unit (CPU), a read only memory (ROM), and random access memory (RAM). The CPU is a processor that executes various types of arithmetic processing. The ROM is a non-volatile storage that stores in advance control programs, such as a basic input output system (BIOS) and an operating system (OS), making the CPU executes the various types of the arithmetic processing. The RAM is a volatile or non-volatile storage unit that stores various types of the information, and is used as temporarily memory (a work area) for various types of processing executed by the CPU. The controller 50 makes the CPU executes the various types of the control programs 211, which are stored in the ROM or the storage 20 in advance, so as to control the writing input apparatus 1.

More specifically, as illustrated in FIG. 3, the controller 50 includes various processing devices such as an input detector 511, the touch-pressure detector 512, a tilt angle detector 513, a tilt angle determination device 514, an input characteristic determination device 515, and a drawing processor 516. When the CPU executes the various types of the processing according to the writing input program, the controller 50 functions as the input detector 511, the touch-pressure detector 512, the tilt angle detector 513, the tilt angle determination device 514, the input characteristic determination device 515, and the drawing processor 516. Some or all of the processing devices provided in the controller 50 may each be constructed of an electronic circuit. The writing input program may be a program that makes a plurality of processors function as the various types of the processing devices.

The input detector 511 detects the touch input to the touch panel input device 111. More specifically, the input detector 511 detects a position coordinate that is input to (designated on) the input surface (for example, the display surface of the display 112) by the touch pen 2 or the user's finger. For example, the input detector 511 detects the positional coordinate by detecting a change in the capacitance between the touch pen 2 or the finger and the input surface.

The touch-pressure detector 512 detects the touch pressure (the writing pressure) as the pressing force that is applied to the touch panel input device 111 and corresponds to the touch input detected by the input detector 511. Any method for detecting the touch pressure (the writing pressure) is adopted as long as the touch-pressure detector 512 can detect the touch pressure (the writing pressure). For example, in the case where the touch panel input device 111 is the touch panel of the pressure-sensitive type, the touch panel input device 111 can have the function of the touch-pressure detector 512. As a method other than the above, a pressure sensitive sensor may be provided as the touch-pressure detector 512 at a tip of the touch pen 2.

The tilt angle detector 513 detects the tilt angle with the horizontally placed state (the horizontal posture), where the touch panel display 10 is placed horizontally, being the reference. More specifically, the tilt angle detector 513 detects the tilt angle of the touch panel display 10 on the basis of a detection result of the acceleration sensor 30. For example, in the case where the touch panel display 10 is in the horizontal posture illustrated in FIG. 2B, the tilt angle detector 513 detects 0 degree as the tilt angle. In the case where the touch panel display 10 is in the vertical posture illustrated in FIG. 2A, the tilt angle detector 513 detects 90 degrees as the tilt angle. Here, in order to clearly define and describe the tilt angle of the touch panel display 10, it is necessary to define one of the angles as the reference for the tilt angle. Accordingly, in the present specification, the tilt angle of the touch panel display 10 is defined and described with the horizontally placed state (the horizontal posture) being the reference. However, in the present specification, a method for defining the tilt angle, such as which angle is used as the reference for the tilt angle, is not an essential part. Therefore, the present disclosure should not be interpreted restrictively by the method for defining the tilt angle, but includes the substantially same technical ideas.

The tilt angle determination device 514 determines whether the tilt angle detected by the tilt angle detector 513 exceeds a threshold. The threshold is a value that triggers switching of a characteristic of the evaluation amount (the input characteristic). The threshold may be set in advance or may appropriately be changed by the user of the writing input apparatus 1. For example, in the case where the touch panel display 10 is configured to be able to switch the tilt angle in the two steps that are the horizontal posture and the vertical posture, the threshold is set to 45 degrees. In this case, the tilt angle determination device 514 determines whether the tilt angle exceeds 45 degrees.

In the case where the touch panel display 10 is configured to be able to switch the tilt angle in the three steps, the threshold is set to a first threshold (for example, 30 degrees) and a second threshold (for example, 60 degrees). In this case, the tilt angle determination device 514 determines whether the tilt angle exceeds 30 degrees, and also determines whether the tilt angle exceeds 60 degrees.

The input characteristic determination device 515 determines the input characteristic corresponding to the touch input on the basis of the touch pressure detected by the touch-pressure detector 512 and the tilt angle detected by the tilt angle detector 513. The input characteristic is the evaluation amount used to evaluate the touch input intensity of the touch input. The touch input intensity is the touch pressure (the writing pressure) intended by the user.

Here, in the case where the tilt angle of the touch panel display 10 is small (for example, 0 degree), the writing pressure detected by the touch-pressure detector 512 tends to be larger than the writing pressure (the touch input intensity) intended by the user. In the case where the tilt angle of the touch panel display 10 is large (for example, 90 degrees), the writing pressure detected by the touch-pressure detector 512 tends to be smaller than the writing pressure (the touch input intensity) intended by the user. Accordingly, in the case where the user makes the touch input with the intention of generating the same pressure when the tilt angles are 0 degree and 90 degrees, the writing pressures detected by the touch-pressure detector 512 differ. As a result, the line width intended by the user may not be drawn.

To handle such a problem, in the writing input apparatus 1, in the case where the touch pressure detected by the touch-pressure detector 512 is a first touch pressure and the tilt angle is a first tilt angle (for example, 0 degrees), the input characteristic determination device 515 determines the input characteristic such that the evaluation amount becomes smaller than that when the tilt angle is a second tilt angle (for example, 90 degrees) that is larger than the first tilt angle.

More specifically, in the case where the tilt angle determination device 514 determines that the tilt angle exceeds the threshold (for example, 45 degrees), the input characteristic determination device 515 sets the input characteristic with respect to the first touch pressure to a first characteristic. Meanwhile, in the case where the tilt angle determination device 514 determines that the tilt angle is equal to or smaller than the threshold, the input characteristic determination device 515 sets the input characteristic with respect to the first touch pressure to a second characteristic, in which the evaluation amount is smaller than that in the first characteristic.

For example, in the case where the tilt angle determination device 514 determines that the tilt angle exceeds the threshold (for example, 45 degrees), the input characteristic determination device 515 sets the input characteristic with respect to the first touch pressure on the basis of the first evaluation amount table 212A (see FIG. 4A). Meanwhile, in the case where the tilt angle determination device 514 determines that the tilt angle is equal to or smaller than the threshold, the input characteristic determination device 515 sets the input characteristic with respect to the first touch pressure on the basis of the second evaluation amount table 212B (see FIG. 4B).

The drawing processor 516 draws the information that corresponds to the touch input detected by the input detector 511 on the display 112 on the basis of the input characteristic determined by the input characteristic determination device 515. For example, in the case where the tilt angle exceeds the threshold (for example, 45 degrees), the drawing processor 516 draws the information that corresponds to the touch input detected by the input detector 511 on the display 112 on the basis of the first evaluation amount table 212A (see FIG. 4A). Meanwhile, in the case where the tilt angle is equal to or smaller than the threshold (for example, 45 degrees), the drawing processor 516 draws the information that corresponds to the touch input detected by the input detector 511 on the display 112 on the basis of the second evaluation amount table 212B (see FIG. 4B).

More specifically, for example, the drawing processor 516 sets the line width of the information to be drawn on the display 112 on the basis of the input characteristic, and draws the information on the display 112 with the set line width. For example, in the case where the touch pressure detected by the touch-pressure detector 512 is "P5" when the user inputs the specified character on the touch panel display 10 in the horizontal posture, the drawing processor 516 draws the character in the line width "Wa5", which is associated with the evaluation amount "Pa5" corresponding to "P5" (see FIG. 4A and FIG. 5), on the display 112. Meanwhile, in the case where the touch pressure detected by the touch-pressure detector 512 is "P5" when the user inputs the character on the touch panel display 10 in the vertical posture, the drawing processor 516 draws the character in the line width "Wb5" (however, Wb5>Wa5), which is associated with the evaluation amount "Pb5" corresponding to "P5" (see FIG. 4B and FIG. 5), on the display 112.

Here, in the case where the shade is set as the setting information, similar to the line width, the drawing processor 516 draws the characters in the shade, which is associated with the evaluation amount "Pa5" or "Pb5" corresponding to "P5", on the display 112 on the basis of the tilt angle.

Writing Input Processing

Figure 6:
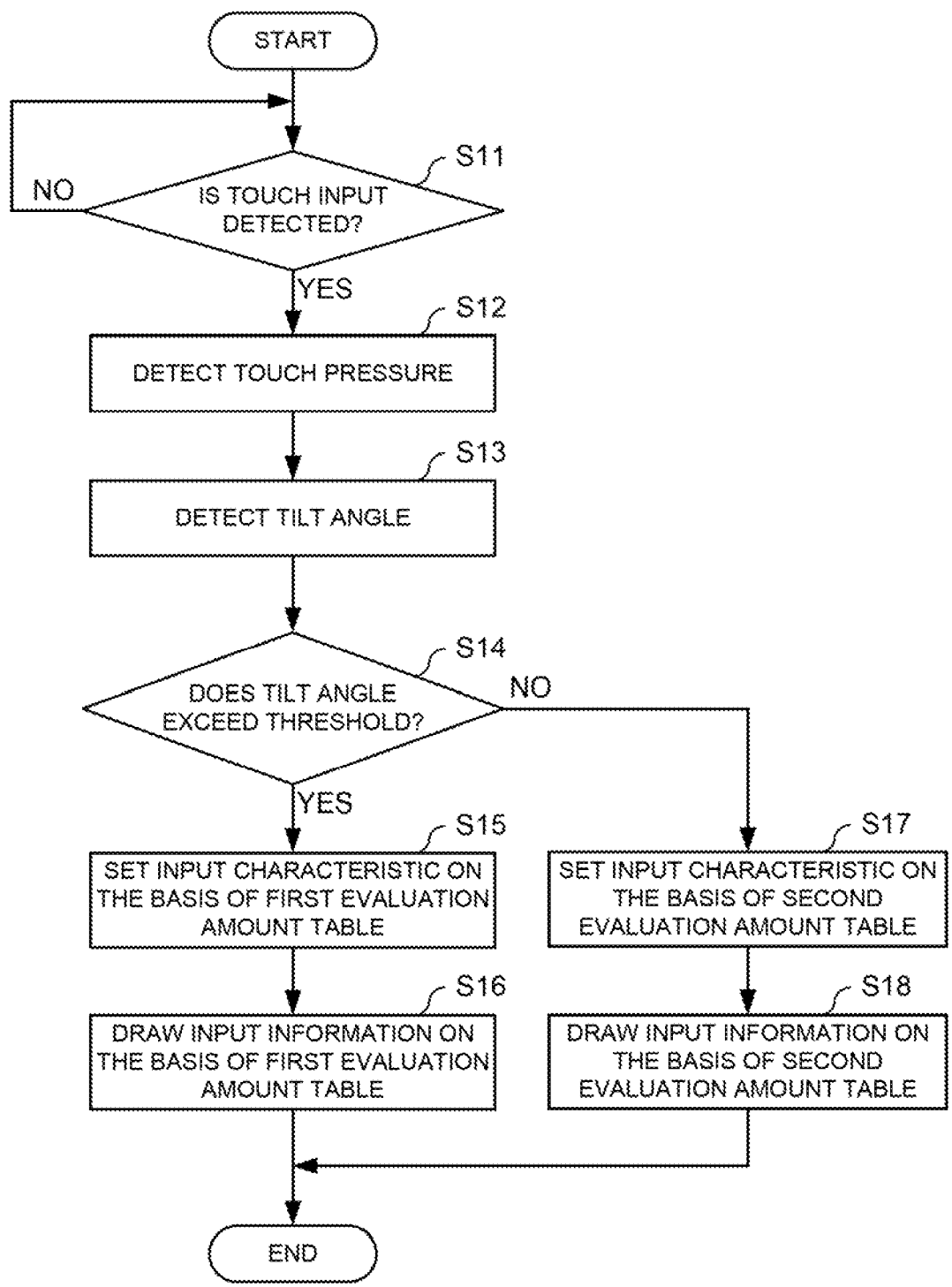
FIG. 6 is a flowchart illustrating an example of a procedure of writing input processing that is executed by the writing input apparatus according to the embodiment of the present disclosure.

A description will hereinafter be made on the writing input processing that is executed by the controller 50 of the writing input apparatus 1 with reference to FIG. 6.

The present disclosure can be regarded as the invention of a writing input method for executing one or more steps included in the writing input processing, and one or more steps included in the writing input processing described herein may appropriately be omitted. An execution order of the steps in the writing input processing may differ within a range where the same operational effect is achieved. Furthermore, a description will herein be made on a case where the controller 50 executes the steps in the writing input processing as an example. However, a writing input method in which the steps in the writing input processing are executed by the plurality of processors in a dispersed manner is also conceivable as another embodiment.

First, in step S11, the controller 50 determines whether the touch input to the touch panel input device 111 is detected. If the touch input is detected (S11: YES), the processing proceeds to step S12. The controller 50 stands by until the touch input is detected (S11: NO). For example, the controller 50 detects the position coordinate that is input to (designated on) the input surface (for example, the display surface of the display 112) by the touch pen 2 or the user's finger.

In step S12, the controller 50 detects the touch pressure corresponding to the touch input.

Next, in step S13, the controller 50 detects the tilt angle of the touch panel display 10. More specifically, the controller 50 detects the tilt angle of the touch panel display 10 on the basis of the detection result of the acceleration sensor 30.

Next, in step S14, the controller 50 determines whether the tilt angle exceeds the threshold. For example, in the case where the touch panel display 10 is configured to be able to switch the tilt angle in the two steps of the horizontal posture and the vertical posture, the controller 50 determines whether the tilt angle exceeds 45 degrees. If the tilt angle exceeds the threshold (S14: YES), the processing proceeds to step S15. If the tilt angle is equal to or smaller than the threshold (S14: NO), the processing proceeds to step S17.

In step S15, the controller 50 sets the input characteristic with respect to the touch pressure on the basis of the first evaluation amount table 212A (see FIG. 4A).

In step S16, the controller 50 draws the information, which corresponds to the touch input detected in step S11, at a position corresponding to the position coordinate on the display 112 on the basis of the first evaluation amount table 212A.

Meanwhile, in step S17, the controller 50 sets the input characteristic with respect to the touch pressure on the basis of the second evaluation amount table 212B (see FIG. 4B).

In step S18, the controller 50 draws the information, which corresponds to the touch input detected in step S11, at the position corresponding to the position coordinate on the display 112 on the basis of the second evaluation amount table 212B.

As it has been described so far, the writing input apparatus 1 according to the first embodiment sets the input characteristic (the first characteristic), which is obtained by correcting the touch pressure detected by the touch-pressure detector 512 to the larger value, for the vertically placed touch panel display 10 (in the vertical posture), and sets the input characteristic (the second characteristic), which is obtained by correcting the touch pressure detected by the touch-pressure detector 512 to the smaller value, on the horizontally placed touch panel display 10 (in the horizontal posture). Just as described, the writing input apparatus 1 determines (sets) the input characteristic corresponding to the touch input according to the tilt angle of the touch panel display 10, and can thereby appropriately reflect the writing pressure intended by the user. Thus, in the case where the touch panel display 10 is used horizontally or vertically, it is possible to prevent an unintentional writing pressure difference caused by a difference in a writing posture of the user at the time when a touch panel is used in horizontal placement and vertical placement.

As illustrated in FIG. 5, in the vicinity of the maximum writing pressure and the minimum writing pressure used in drawing processing, the same evaluation amount may be set for the touch panel display 10 in the horizontal posture and the touch panel display 10 in the vertical posture.

In addition, for each of the users, the evaluation amounts that correspond to the touch pressures registered in the evaluation amount tables may vary per user. For example, in the touch panel display 10 in the vertical posture, a standard writing pressure of the user may be measured in advance, and then the evaluation amounts for the horizontal posture and the vertical posture may be set on the basis of the measured standard writing pressure. In this way, the appropriate evaluation amounts can be set per user. Thus, it is possible to further appropriately reflect the writing pressure intended by the user.

As described above, the present invention is characterized that the input characteristic determination device 515 determines the input characteristic corresponding to the touch input on the basis of the touch pressure detected by the touch-pressure detector 512 and the tilt angle detected by the tilt angle detector 513. That is, one output value referred to as the input characteristic (the evaluation amount), which corresponds to the touch input, is obtained on the basis of two input values of the touch pressure and the tilt angle.

As a method for such a purpose, the first embodiment corresponds to an embodiment for determining the input characteristic (the evaluation amount in two steps. The storage 20 stores two two-dimensional tables of the first evaluation amount table 212A and the second evaluation amount table 212B, in each of which a correlation between the pressing force as the input value and the evaluation amount as the output value to be obtained is described. Then, in the first step, it is determined which of those two two-dimensional tables is used on the basis of the tilt angle. In the second step, the input characteristic (the evaluation amount) is determined on the basis of the two-dimensional table determined in the first step.

According to this method, a data volume per table that is stored in the storage 20 can be reduced. The first embodiment is suited for a case where the tilt angle is evaluated roughly, and the pressing force is evaluated finely, so as to determine the input characteristic (the evaluation amount).

Note that the present disclosure is not limited to the above-described embodiment. Modified embodiments corresponding to other embodiments of the present disclosure will be described below.

First Modified Embodiment

In a writing input apparatus 1 according to a first modified embodiment, the storage 20 further includes a third table in which the touch pressure and the tilt angle with respect to the touch panel input device 111 and the input characteristic with respect to the touch pressure are associated with each other. The input characteristic determination device 515 sets the input characteristic with respect to the first touch pressure and the tilt angle on the basis of the third table.

The following points are differences between the first modified embodiment and the first embodiment. One of the points is that, while the first table (the first evaluation amount table 212A) and the second table (the second evaluation amount table 212B) in the first embodiment are the two-dimensional tables for obtaining the one output value as the input characteristic (the evaluation amount) on the basis of the one input value referred to as the pressing force, the third table in the first modified embodiment is a three-dimensional table for obtaining the one output value referred to as the input characteristic (the evaluation amount) on the basis of the two input values referred to as the pressing force and the tilt angle. The other point is that, while the tilt angle and the input characteristic (the evaluation amount) are separately determined in the two steps in the first embodiment, the input characteristic (the evaluation amount) is determined in one step in the first modified embodiment.

Although, in the first modified embodiment, the input characteristic (the evaluation amount) can be determined in the one step, the data volume per table that is stored in the storage 20 is increased. Thus, the first modified embodiment is suited for a case where both the tilt angle and the pressing force are evaluated finely to determine the input characteristics (evaluation amount).

Second Modified Embodiment

The input characteristic determination device 515 may determine a basic evaluation amount on the basis of the touch pressure, may determine a correction amount on the basis of the tilt angle, and may determine the input characteristic on the basis of the basic evaluation amount and the correction amount. More specifically, in the case where the tilt angle is large, the input characteristic determination device 515 calculates the relatively large correction amount, adds the relatively large correction amount to the basic evaluation amount, and thereby determines the input characteristic.

The storage 20 stores: a basic evaluation amount table in which the touch pressure applied to the touch panel input device 111 and the basic evaluation amount with respect to the touch pressure are associated with each other; and a correction amount table in which the tilt angle and the correction amount for the tilt angle are associated with each other. Here, in the correction amount table, the tilt angle and the correction amount for the tilt angle are associated with each other such that the correction amount is increased with an increase in the tilt angle.

For example, in the touch panel display 10 in the vertical posture, in the case where the touch pressure detected by the touch-pressure detector 512 is "P0" using the basic evaluation amount table, the input characteristic determination device 515 determines the basic evaluation amount "Ps" that is associated with "P0". Then, the input characteristic determination device 515 determines the correction amount "Pt1" that corresponds to the tilt angle using the correction amount table, and determines the input characteristic from the evaluation amount "Ps+Pt1" that is acquired by adding the correction amount "Pt1" to the basic evaluation amount "Ps".

In addition, for example, in the touch panel display 10 in the horizontal posture, in the case where the touch pressure detected by the touch-pressure detector 512 is "P0", the input characteristic determination device 515 determines the basic evaluation amount "Ps" that is associated with "P0". Then, the input characteristic determination device 515 determines the correction amount "Pt2" (here, Pt2<Pt1) that corresponds to the tilt angle, and determines the input characteristic from the evaluation amount "Ps+Pt2" that is acquired by adding the correction amount "Pt2" to the basic evaluation amount "Ps".

Similar to the above-described first embodiment, a second modified embodiment corresponds to an embodiment in which the storage 20 stores the two two-dimensional tables and the input characteristic (the evaluation amount) is determined in the two steps.

In the above-described first embodiment, the tilt angle is finely determined. Thus, in the case where the tilt angle is determined in multiple steps that are three or more steps, the number of the evaluation amount tables is increased to be three or more.

On the other hand, according to the second modified embodiment, the input characteristic determination device 515 determines the basic evaluation amount with respect to the touch pressure on the basis of the basic evaluation amount table, determines the correction amount for the tilt angle on the basis of the correction amount table, and determines the input characteristic (the evaluation amount) on the basis of a total sum of the basic evaluation amount and the correction amount. Accordingly, even in the case where the tilt angle is finely determined, the number of the tables is not increased. In addition, the data volume can be reduced. Thus, the second modified embodiment is suited for a case where the input characteristic (the evaluation amount) is regarded as an amount that separately depends on the pressing force and the tilt angle.

Third Modified Embodiment

Figure 7A:
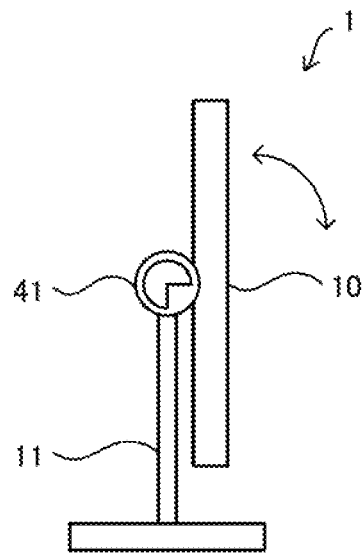
FIG. 7A is a side view illustrating another configuration of the writing input apparatus in the vertical posture according to the embodiment of the present disclosure.
Figure 7B:
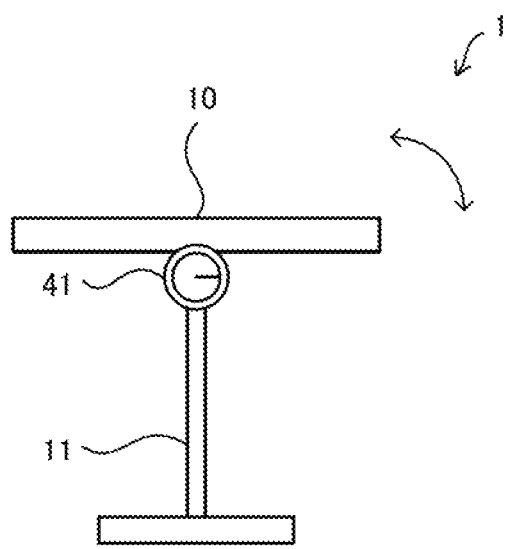
FIG. 7B is a side view illustrating another configuration of the writing input apparatus in the horizontal posture according to the embodiment of the present disclosure.

The angle adjuster 40 illustrated in FIG. 2 may have a function of detecting a rotation angle of the touch panel display 10. FIG. 7A and FIG. 7B each illustrate an angle adjuster 41 that has a function of detecting the rotation angle. The angle adjuster 41 is an example of a support device and a rotation angle detector in the present disclosure. The angle adjuster 41 detects the rotation angle within the range from 0 degree to 90 degrees according to rotating operation of the touch panel display 10 and supports the touch panel display 10 at the rotation angle. The tilt angle detector 513 detects the tilt angle of the touch panel display 10 on the basis of the rotation angle detected by the angle adjuster 41. In the configurations illustrated in FIG. 7A and FIG. 7B, the acceleration sensor 30 can be omitted.

Fourth Modified Embodiment

The writing input apparatus 1 may store a plurality of setting information tables (for example, a plurality of line width information tables) corresponding to the tilt angle of the touch panel display 10. For example, in each of the line width information tables, the touch pressure detected by the touch-pressure detector 512 and the line width corresponding to the touch pressure are associated with each other.

Mutually different values are set for the line width, which corresponds to the touch pressure, in the plurality of line width information tables. FIG. 8A is a table illustrating an example of a first line width information table 213A that corresponds to the tilt angle of 90 degrees (the vertical posture). FIG. 8B is a table illustrating an example of a second line width information table 213B that corresponds to the tilt angle of 0 degree (the horizontal posture).

The same touch pressures are set in the first line width information table 213A and the second line width information table 213B. The line width set in the second line width information table 213B is smaller than the line width set in the first line width information table 213A at each of the touch pressures. For example, at a touch pressure "P5", the line width "Wb5" set in the second line width information table 213B is smaller than the line width "Wa5" set in the first line width information table 213A (Wa5>Wb5).

Figure 9:
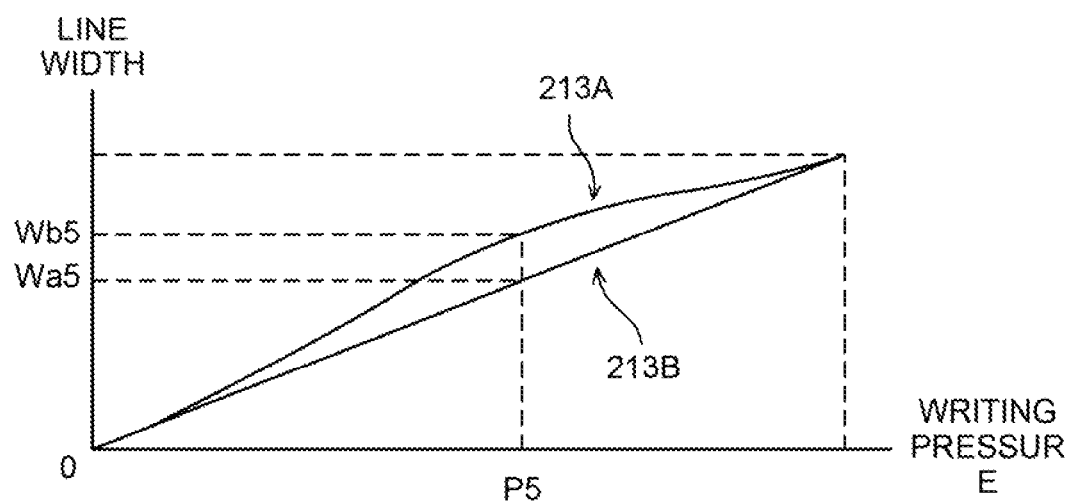
FIG. 9 is a graph illustrating a change in a line width with respect to the touch pressure corresponding to the first line width table and the second line width table in the writing input apparatus according to the embodiment of the present disclosure.

FIG. 9 is a graph illustrating a change in the line width with respect to the touch pressure corresponding to the first line width information table 213A and the second line width information table 213B.

In this configuration, for example, in the case where the tilt angle exceeds the threshold (for example, 45 degrees), the drawing processor 516 draws the information, which corresponds to the touch input detected by the input detector 511, in the line width based on the first line width information table 213A (see FIG. 8A) on the display 112. Meanwhile, in the case where the tilt angle is equal to or smaller than the threshold (for example, 45 degrees), the drawing processor 516 draws the information, which corresponds to the touch input detected by the input detector 511, in the line width based on the second line width information table 213B (see FIG. 8B) on the display 112.

Fifth Modified Embodiment

The legs 11 of the writing input apparatus 1 may be omitted. That is, the writing input apparatus 1 may be a mobile terminal such as a smartphone.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A writing input apparatus comprising:
    a touch panel input device;
    input detecting circuitry that detect touch input to the touch panel input device;
    touch-pressure detecting circuitry that detect a touch pressure as a pressing force applied to the touch panel input device and corresponding to the touch input detected by the input detecting circuitry;
    tilt angle detecting circuitry that detect a tilt angle with a horizontally placed state of the touch panel input device being a reference; and
    input characteristic determination circuitry that determine an input characteristic corresponding to the touch input on the basis of the touch pressure detected by the touch-pressure detecting circuitry and the tilt angle detected by the tilt angle detecting circuitry;
    wherein the input characteristic is an evaluation amount used to evaluate touch input intensity of the touch input, and
    in the case where the touch pressure detected by the touch-pressure detecting circuitry is a first touch pressure,
    the input characteristic determination circuitry determine the input characteristic such that, when the tilt angle is a first tilt angle, the evaluation amount becomes smaller than the evaluation amount when the tilt angle is a second tilt angle that is larger than the first tilt angle.

2. The writing input apparatus according to claim 1 further comprising:
    a display; and
    a drawing processor, wherein
    the drawing processor draws information that corresponds to the touch input detected by the input detecting circuitry on the display on the basis of the input characteristic.

3. The writing input apparatus according to claim 2, wherein the drawing processor sets a line width of the information to be drawn on the display on the basis of the input characteristic.

4. The writing input apparatus according to claim 1 further comprising:
    tilt angle determination circuitry that determine whether the tilt angle detected by the tilt angle detecting circuitry exceed a threshold, wherein
    the input characteristic determination circuitry set the input characteristic with respect to the first touch pressure to a first characteristic when the tilt angle determination circuitry determine that the tilt angle exceeds the threshold, and set the input characteristic with respect to the first touch pressure to a second characteristic, the evaluation amount of second characteristic is smaller than the evaluation amount of the first characteristic when the tilt angle determination circuitry determine that the tilt angle is equal to or smaller than the threshold.

5. The writing input apparatus according to claim 4 further comprising:
    a storage that stores a first table and a second table, in which the touch pressure and the input characteristic with respect to the touch pressure are associated with each other, wherein
    the input characteristic determination circuitry set the input characteristic with respect to the first touch pressure on the basis of the first table when the tilt angle determination circuitry determine that the tilt angle exceeds the threshold, and set the input characteristic with respect to the first touch pressure on the basis of the second table when the tilt angle determination circuitry determine that the tilt angle is equal to or smaller than the threshold.

6. The writing input apparatus according to claim 1 further comprising:
    a storage that stores a third table, in which each of the touch pressure and the tilt angle, and the input characteristic are associated with each other, wherein
    the input characteristic determination circuitry set the input characteristics with respect to the touch pressure and the tilt angle on the basis of the third table.

7. The writing input apparatus according to claim 1, wherein the input characteristic determination circuitry determine a basic evaluation amount on the basis of the first touch pressure, determine a correction amount on the basis of the tilt angle, and determine the input characteristic on the basis of the basic evaluation amount and the correction amount.

8. The writing input apparatus according to claim 1 further comprising:
    an acceleration sensor that detects a tilt with respect to a gravity direction, wherein
    the tilt angle detecting circuitry detect the tilt angle of the touch panel input device on the basis of a detection result of the acceleration sensor.

9. The writing input apparatus according to claim 1 further comprising:
    a leg that supports the writing input apparatus; and
    a support device that is arranged between the leg and the touch panel input device and rotatably supports the touch panel input device, wherein
    the support device includes an angle adjuster that detects a rotation angle according to rotating operation of the touch panel input device, and the tilt angle detecting circuitry detect the tilt angle of the touch panel input device on the basis of the rotation angle detected by the angle adjuster.

\* \* \* \* \*